(12) United States Patent
Saitoh

(10) Patent No.: US 11,024,861 B2
(45) Date of Patent: Jun. 1, 2021

(54) VEHICLE AND CONTROL METHOD THEREOF

(71) Applicant: Toyota Jidosha Kabushiki Kaisha, Toyota (JP)

(72) Inventor: Hiromu Saitoh, Toyota (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 26 days.

(21) Appl. No.: 16/352,294

(22) Filed: Mar. 13, 2019

(65) Prior Publication Data

US 2019/0288309 A1 Sep. 19, 2019

(30) Foreign Application Priority Data

Mar. 16, 2018 (JP) .............................. JP2018-048665

(51) Int. Cl.
| | |
|---|---|
| *H01M 8/04* | (2016.01) |
| *H01M 8/04313* | (2016.01) |
| *B60L 50/72* | (2019.01) |
| *B60L 3/00* | (2019.01) |
| *H01M 8/04089* | (2016.01) |
| *G01S 13/58* | (2006.01) |

(52) U.S. Cl.
CPC ....... *H01M 8/04313* (2013.01); *B60L 3/0053* (2013.01); *B60L 50/72* (2019.02); *G01S 13/58* (2013.01); *H01M 8/04089* (2013.01)

(58) Field of Classification Search
None
See application file for complete search history.

(56) References Cited

U.S. PATENT DOCUMENTS

| | | | |
|---|---|---|---|
| 2010/0065359 A1 | 3/2010 | Jufuku et al. | |
| 2016/0254554 A1* | 9/2016 | Hoshi | H01M 8/04753 429/431 |
| 2017/0222238 A1* | 8/2017 | Kumada | H01M 8/04 |
| 2019/0016233 A1* | 1/2019 | Jeon | B60L 50/70 |

FOREIGN PATENT DOCUMENTS

| | | | | |
|---|---|---|---|---|
| JP | 2008-112647 A | * | 5/2008 | ............ Y02E 60/50 |
| JP | 2008-279955 A | | 11/2008 | |
| JP | 2010-061960 A | | 3/2010 | |
| JP | 2011-258567 A | | 12/2011 | |

* cited by examiner

*Primary Examiner* — Ula C Ruddock
*Assistant Examiner* — Tony S Chuo
(74) *Attorney, Agent, or Firm* — Dinsmore & Shohl LLP

(57) ABSTRACT

A fuel cell vehicle performs a control for increasing a flow rate of a cathode gas discharged to a discharge pipe when parameters including power consumption of a driving motor, a speed, and an acceleration has satisfied a flooding condition which is assumed to be satisfied in a state where a water surface reaches a discharge port in comparison with a case where the flooding condition is not satisfied. It is determined that the predetermined flooding condition has been satisfied when a state where at least three conditions, (i) the power consumption of the driving motor is equal to or greater than a predetermined first threshold value, (ii) the speed is equal to or less than a predetermined second threshold value, and (iii) the acceleration is equal to or less than a predetermined third threshold value, are satisfied is continuously maintained for a predetermined fourth threshold value or more.

5 Claims, 5 Drawing Sheets

VEHICLE AND CONTROL METHOD THEREOF

CROSS-REFERENCE TO RELATED APPLICATION

This application claims priority to Japanese Patent Application No. 2018-048665 filed on Mar. 16, 2018, incorporated herein by reference in its entirety.

BACKGROUND

1. Technical Field

The disclosure relates to a vehicle in which a fuel cell system is mounted and a control method thereof.

2. Description of Related Art

Japanese Unexamined Patent Application Publication No. 2008-279955 (JP 2008-279955 A) discloses a fuel-cell vehicle including an anode gas detector that detects leakage of an anode gas which is used for a fuel cell. In the fuel-cell vehicle described in Japanese Unexamined Patent Application Publication No. 2010-61960 (JP 2010-61960 A), an anode exhaust gas including a liquid is discharged from a gas-liquid separator disposed in an anode gas circulation system to a discharge pipe and the anode exhaust gas is diluted with a cathode gas and is then discharged from the vehicle.

SUMMARY

Here, when a fuel-cell vehicle is traveling on a flooded road and a water surface reaches a discharge port that discharges gas including an anode gas to the outside of the vehicle, there is concern that the gas discharged from the discharge port may not diffuse normally to the outside of the vehicle. In this case, the inventor of the disclosure found that gas including an anode gas invades into the vehicle from a gap of the vehicle and reaches an anode gas detector disposed in the vehicle and thus there is a likelihood that the anode gas detector will erroneously detect leakage of an anode gas.

(1) According to a first aspect of the disclosure, there is provided a vehicle in which a fuel cell system is mounted. The vehicle includes: a fuel cell that generates electric power by electrochemical reaction between an anode gas and a cathode gas; a discharge pipe that includes a discharge port for discharging gas including the anode gas and the cathode gas; a cathode gas supply unit that supplies the cathode gas to the discharge pipe; a driving motor that drives wheels of the vehicle; a first electric power measuring unit that measures power consumption of the driving motor; a second electric power measuring unit that measures electric power generated by the fuel cell; a vehicle speed sensor that measures a speed and an acceleration of the vehicle; and a control unit configured to control the cathode gas supply unit. When a plurality of operation state parameters has satisfied a predetermined flooding condition, the control unit is configured to perform cathode gas increase control for increasing a flow rate of the cathode gas supplied from the cathode gas supply unit to the discharge pipe such that the flow rate of the cathode gas when the predetermined flooding condition is satisfied is greater than the flow rate of the cathode gas when the predetermined flood condition is not satisfied on a condition that an amount of electric power generated by the fuel cell when the predetermined flood condition is satisfied is equal to an amount of electric power generated by the fuel cell when the predetermined flood condition is not satisfied. The plurality of operation state parameters includes the power consumption of the driving motor and the speed and the acceleration of the vehicle. The predetermined flooding condition is assumed to be satisfied in a state in which a water surface reaches the discharge port. The control unit is configured to determine that the predetermined flooding condition has been satisfied when a state in which at least three conditions, (i) the power consumption of the driving motor is equal to or greater than a predetermined first threshold value, (ii) the speed is equal to or less than a predetermined second threshold value, and (iii) the acceleration is equal to or less than a predetermined third threshold value, are satisfied is continuously maintained for a predetermined fourth threshold value or more. In the vehicle according to this aspect, it is possible to satisfactorily dilute an amount of anode gas in the gas discharged from the discharge port by performing the cathode gas increase control in a situation in which a water surface is assumed to have reached the discharge port. As a result, it is possible to prevent an anode gas detector from erroneously detecting leakage of an anode gas.

(2) In the vehicle according to the aspect, the first threshold value may be set to ⅓ of a maximum output of the driving motor, the second threshold value may be set to 30 km/h, the third threshold value may be set to 0.1 m/s$^2$, and the fourth threshold value may be set to 2 seconds. In the vehicle according to this aspect, it is possible to prevent an anode gas detector from erroneously detecting leakage of an anode gas.

(3) The vehicle according to the aspect may further include an accelerator operation amount sensor that measures an amount of accelerator operation of the vehicle. The control unit may be configured to determine that the predetermined flooding condition has been satisfied when a state in which at least five conditions, (i) the amount of accelerator operation is equal to or greater than a predetermined fifth threshold value, (ii) the amount of electric power generated by the fuel cell is equal to or greater than a predetermined sixth threshold value, (iii) the power consumption of the driving motor is equal to or greater than the predetermined first threshold value, (iv) the speed is equal to or less than the predetermined second threshold value, and (v) the acceleration is equal to or less than the predetermined third threshold value, are satisfied is continuously maintained for the predetermined fourth threshold value or more. In the vehicle according to this aspect, the cathode gas increase control can be performed when there is a high likelihood that a water surface will have reached the discharge port.

(4) The vehicle according to the aspect may further include an inclination angle detecting unit configured to detect an inclination angle in a length direction of the vehicle with respect to a horizontal plane. The control unit may be configured to prohibit the cathode gas increase control when the inclination angle indicates an uphill inclination of +3° or more. In the vehicle according to this aspect, since the cathode gas increase control is not performed in a situation in which the vehicle is considered to be traveling on an uphill road, it is possible to improve fuel efficiency.

(5) According to a second aspect of the disclosure, there is provided a control method for a vehicle in which a fuel cell system including a fuel cell that generates electric power by electrochemical reaction between an anode gas and a cathode gas, a discharge pipe that includes a discharge port for discharging gas including the anode gas and the cathode gas, a cathode gas supply unit that supplies the cathode gas to the discharge pipe, and a driving motor that drives wheels of the vehicle is mounted. The control method comprises: when a plurality of operation state parameters has satisfied a predetermined flooding condition, performing cathode gas increase control for increasing a flow rate of the cathode gas supplied from the cathode gas supply unit to the discharge pipe such that the flow rate of the cathode gas when the predetermined flooding condition is satisfied is greater than the flow rate of the cathode gas when the predetermined flood condition is not satisfied on a condition that an amount of electric power generated by the fuel cell when the predetermined flood condition is satisfied is equal to an amount of electric power generated by the fuel cell when the predetermined flood condition is not satisfied, the plurality of operation state parameters including power consumption of the driving motor and a speed and an acceleration of the vehicle, and the predetermined flooding condition being assumed to be satisfied in a state in which a water surface reaches the discharge port; and determining that the predetermined flooding condition has been satisfied when a state in which at least three conditions, (i) the power consumption of the driving motor is equal to or greater than a predetermined first threshold value, (ii) the speed is equal to or less than a predetermined second threshold value, and (iii) the acceleration is equal to or less than a predetermined third threshold value, are satisfied is continuously maintained for a predetermined fourth threshold value or more.

The disclosure can be embodied in various forms.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION

A. First Embodiment

Figure 1:
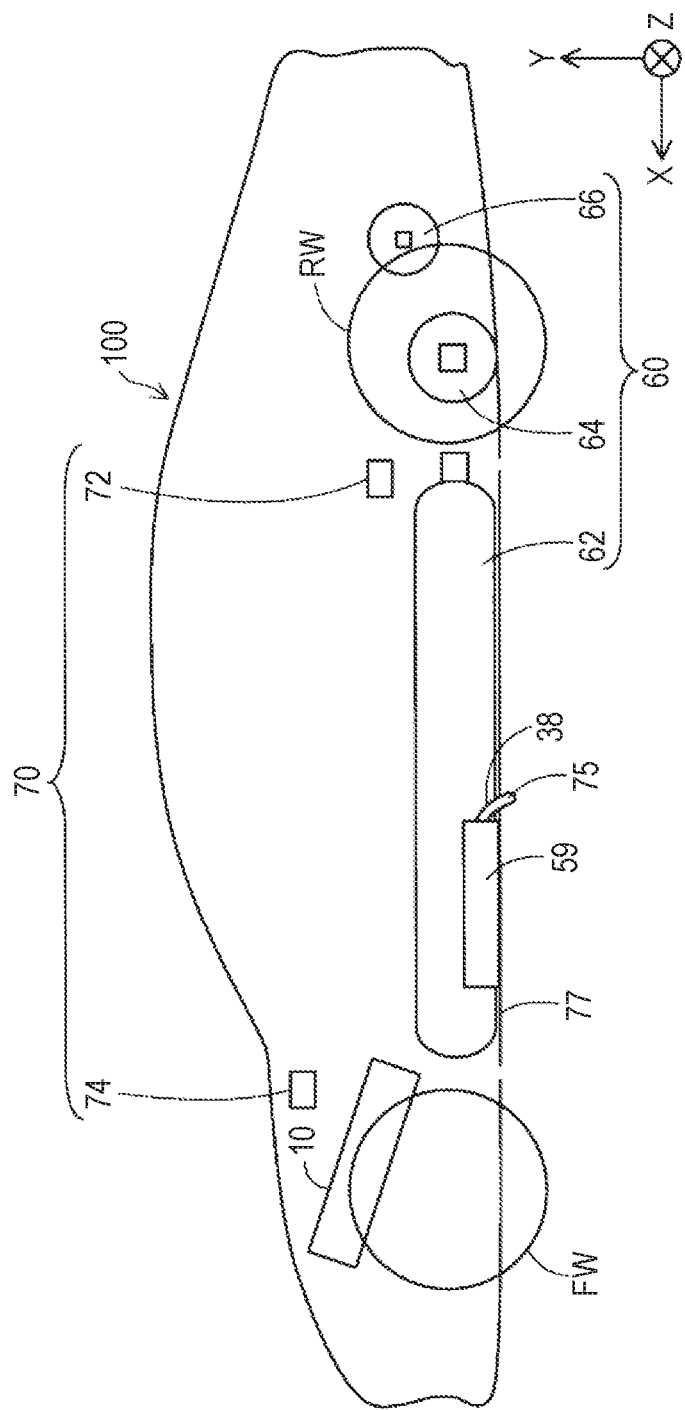
FIG. 1 is a diagram schematically illustrating a vehicle according to an embodiment of the disclosure.

FIG. 1 is a diagram schematically illustrating a vehicle 100 according to an embodiment of the disclosure. Descriptions associated with directions in the vehicle 100 ("right," "left," "front," "rear," "upward," and "downward") are based on the bearing of a driver in the vehicle 100. In FIG. 1, an X-axis positive direction indicates a vehicle front side, a Y-axis positive direction indicates an upper side in a gravitational direction, and a Z-axis positive direction indicates a vehicle right side. That is, an X-axis direction indicates a length direction of a vehicle, a Y-axis direction indicates a gravitational direction, and a Z-axis direction indicates a width direction of a vehicle. The X, Y, and X axes are the same in FIG. 1 and the following drawings.

The vehicle 100 includes a fuel cell stack (hereinafter simply referred to as a "fuel cell") 10, a discharge pipe 38 including a discharge port 75, an anode gas tank 60, and an anode gas detector 70. The fuel cell 10 has, for example, a configuration in which power generation modules including a membrane-electrode assembly (MEA) in which two electrodes of an anode and a cathode are bonded to both sides of an electrolyte membrane are stacked. The fuel cell 10 generates electric power by electrochemical reactions between a hydrogen gas serving as an anode gas supplied from the anode gas tank 60 and oxygen in the atmosphere serving as a cathode gas. In this embodiment, the fuel cell 10 is disposed on the front side (in the +X-axis direction) of the vehicle 100. Specifically, in the length direction (the X-axis direction) of the vehicle 100, the fuel cell 10 is disposed at a position at which a part thereof overlaps a front wheel FW.

In this embodiment, the anode gas tank 60 of the vehicle 100 includes a first anode gas tank 62, a second anode gas tank 64, and a third anode gas tank 66. In this embodiment, the first anode gas tank 62 is provided between the front wheel FW and a rear wheel RW in the length direction (the X-axis direction) of the vehicle 100 and is disposed in the length direction (the X-axis direction) of the vehicle 100. The second anode gas tank 64 is provided at a position overlapping the rear wheel RW in the length direction (the X-axis direction) of the vehicle 100 and is disposed in the width direction (the Z-axis direction) of the vehicle 100. The third anode gas tank 66 is provided at a position at which a part thereof overlaps the rear wheel RW in the length direction (the X-axis direction) of the vehicle 100 and another part thereof is located behind the rear wheel RW and is disposed in the width direction (the Z-axis direction) of the vehicle 100. In this embodiment, the second anode gas tank 64 is provided on the front side (the +X-axis direction) of the vehicle 100 more than the third anode gas tank 66.

The anode gas detector 70 is a device that detects leakage of an anode gas. In this embodiment, the anode gas detector 70 is a device that can also measure a concentration of an anode gas. In this embodiment, the anode gas detector 70 includes a first anode gas detector 72 and a second anode gas detector 74. For example, a hydrogen detector can be used as the anode gas detector.

In this embodiment, the first anode gas detector 72 is provided above the anode gas tank 60 in order to detect leakage of an anode gas from the anode gas tank 60. Specifically, the first anode gas detector 72 is provided between the front wheel FW and the rear wheel RW in the length direction (the X-axis direction) of the vehicle 100 and is more specifically provided at a position in the length direction (the X-axis direction) of the vehicle 100 which is behind the center of the vehicle 100 and before the rear wheel RW.

In this embodiment, the second anode gas detector 74 is provided above the fuel cell 10 in order to detect leakage of an anode gas from the fuel cell 10. Specifically, the second anode gas detector 74 is provided at a position overlapping the fuel cell 10 in the length direction (the X-axis direction) of the vehicle 100. The number or arrangement of the anode gas detectors 70 and the number or arrangement of the anode gas tanks 60 can be arbitrarily set.

The discharge pipe 38 is provided to discharge gas which has not been used for the fuel cell 10 or water which is generated in the fuel cell 10 to the outside of the vehicle. The discharge port 75 of the discharge pipe 38 protrudes from a hole formed in an undercover 77 of the vehicle 100 downward from the vehicle 100. In this embodiment, the discharge port 75 is provided between the front wheel FW and the rear wheel RW in the length direction (the X-axis direction).

Figure 2:
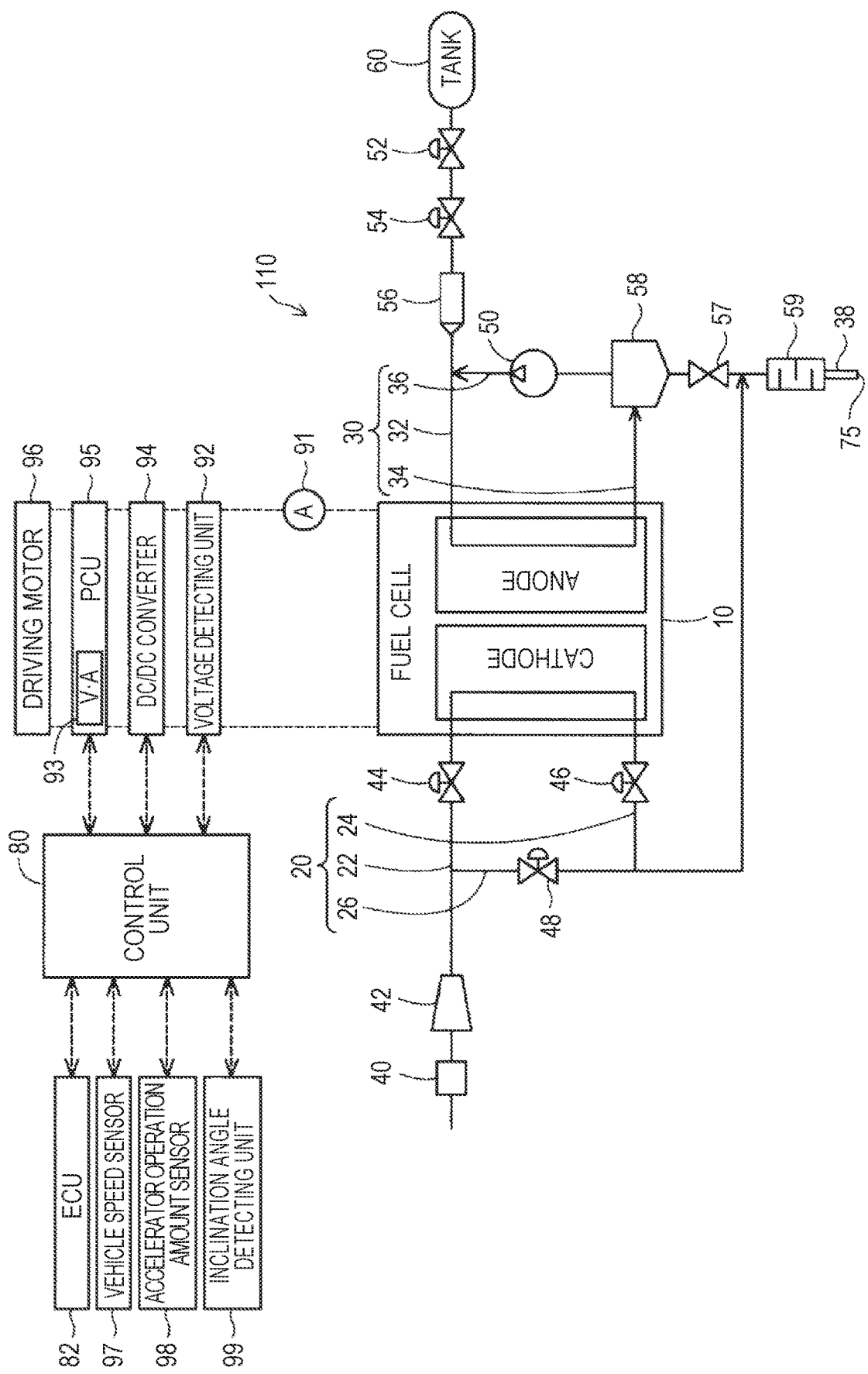
FIG. 2 is a diagram schematically illustrating a configuration of a fuel cell system which is mounted in a vehicle.

FIG. 2 is a diagram schematically illustrating a configuration of a fuel cell system 110 which is mounted in the vehicle 100. The fuel cell system 110 includes a fuel cell 10, a cathode gas flow passage 20, an anode gas flow passage 30, a discharge pipe 38, and a control unit 80.

The cathode gas flow passage 20 is a flow passage that supplies and discharges a cathode gas to and from the fuel cell 10. The cathode gas flow passage 20 includes a cathode gas supply passage 22 that supplies a cathode gas to the fuel cell 10, a cathode gas discharge passage 24 that discharges a cathode gas from the fuel cell 10, and a bypass flow passage 26 that allows the cathode gas supply passage 22 and the cathode gas discharge passage 24 to communicate with each other.

In the cathode gas supply passage 22, an air flowmeter 40, a compressor 42, and an ON-OFF valve 44 are arranged sequentially from upstream to downstream. The air flowmeter 40 is a device that measures a flow rate of intake air. The compressor 42 is a device that compresses intake air and supplies the compressed air as a cathode gas to the fuel cell 10. The ON-OFF valve 44 is a valve that controls flow of a cathode gas from the compressor 42 to the fuel cell 10.

A pressure control valve 46 that controls a pressure of a cathode gas on a cathode outlet side of the fuel cell 10 is provided in the cathode gas discharge passage 24. A flow control valve 48 that controls a flow rate of a cathode gas in the bypass flow passage 26 is provided in the bypass flow passage 26. In this embodiment, the bypass flow passage 26 is a flow passage that connects a part between the compressor 42 and the ON-OFF valve 44 in the cathode gas supply passage 22 to a downstream part from the pressure control valve 46 in the cathode gas discharge passage 24.

The anode gas flow passage 30 is a flow passage that supplies and discharges an anode gas to and from the fuel cell 10. The anode gas flow passage 30 includes an anode gas supply passage 32 that supplies an anode gas to the fuel cell 10, an anode gas discharge passage 34 that discharges an anode gas from the fuel cell 10, and an anode gas circulation passage 36 that allows the anode gas supply passage 32 and the anode gas discharge passage 34 to communicate with each other.

The anode gas supply passage 32 is connected to the anode gas tank 60. In the anode gas supply passage 32, an ON-OFF valve 52, a regulator 54, and an injector 56 are provided sequentially from upstream to downstream. The ON-OFF valve 52 is a valve that controls flow of an anode gas from the anode gas tank 60 to upstream from the injector 56. The regulator 54 is a valve that controls a pressure of an anode gas upstream from the injector 56. The injector 56 is a valve that controls flow of an anode gas into the fuel cell 10. In this embodiment, the injector 56 is provided upstream from a part of the anode gas supply passage 32 communicating with the anode gas circulation passage 36.

The anode gas discharge passage 34 is connected to a gas-liquid separator 58. The anode gas discharge passage 34 guides an unreacted gas (an anode gas, a nitrogen gas, or the like) which has not been used for electrochemical reaction in the fuel cell 10 to the gas-liquid separator 58.

The gas-liquid separator 58 separates gas and liquid which are discharged from the anode of the fuel cell 10. The gas-liquid separator 58 is connected to the anode gas circulation passage 36 and the discharge pipe 38. The gas-liquid separator 58 guides an unreacted anode gas which has not been used for electrochemical reaction in the fuel cell 10 to the anode gas circulation passage 36 and guides liquid including water or nitrogen gas which is generated in the fuel cell 10 to the discharge pipe 38.

The discharge pipe 38 is a pipe that discharges liquid and gas separated by the gas-liquid separator 58 to the outside of the fuel cell system 110. In the discharge pipe 38, a drain valve 57 that discharges gas and liquid and a silencer 59 that reduces sound at the time of discharging gas and liquid are provided sequentially from upstream to downstream, and the discharge port 75 is provided at an end of the discharge pipe 38. A substance which is discharged from the discharge port 75 includes water which is generated in the vehicle 100, nitrogen gas included in an anode exhaust gas, and a cathode exhaust gas and may include a small amount of anode gas (hydrogen gas). That is, the discharge pipe 38 also discharges gas including an anode gas and a cathode gas.

In this embodiment, the cathode gas discharge passage 24 is connected between the drain valve 57 and the silencer 59 of the discharge pipe 38. Accordingly, the cathode gas flow passage 20 and the compressor 42 and the valves 44, 46, and 48 which are provided in the cathode gas flow passage 20 serve as a "cathode gas supply unit" that supplies a cathode gas to the discharge port 75.

A pump 50 is provided in the anode gas circulation passage 36. The pump 50 supplies gas including an anode gas separated by the gas-liquid separator 58 to the anode gas supply passage 32. In the fuel cell system 110, usage efficiency of an anode gas is improved by circulating the anode gas and supplying the anode gas to the fuel cell 10 again.

The control unit 80 is constituted as a computer including a central processing unit (CPU), a memory, and an interface circuit to which the above-mentioned elements are connected. The control unit 80 outputs signals for controlling start and stop of constituent components of the fuel cell system 110 in accordance with an instruction from an electronic control unit (ECU) 82. The ECU 82 is a control unit that controls the vehicle 100 including the fuel cell system 110 as a whole. For example, in the vehicle 100, the ECU 82 controls the vehicle 100 based on values of a plurality of operation state parameters such as an amount of depression of an accelerator pedal, an amount of depression of a brake pedal, and a vehicle speed. The "operation state parameter" refers to a parameter indicating an operation state of the vehicle 100 including the fuel cell system 110 and power consumption of a driving motor 96 and electric power generated by the fuel cell 10 are also a type of operation state parameters. The ECU 82 may be included as a part of a function of the control unit 80. The CPU controls power generation in the fuel cell system 110 and realizes a flooding determining process which will be described later by executing a control program stored in the memory. A vehicle speed sensor 97 that measures a speed and an acceleration of the vehicle 100, an accelerator operation amount sensor 98 that measures an amount of operation of an accelerator, and an inclination angle detecting unit 99 that detects an inclination angle in the length direction (the X-axis direction) of the vehicle with respect to a horizontal plane are connected to the control unit 80. For example, a three-axis acceleration sensor or a gyro sensor can be used as the inclination angle detecting unit 99. The accelerator operation amount sensor 98 and the inclination angle detecting unit 99 may be connected to the ECU 82. The acceleration of the vehicle 100 is acquired by differentiating the speed of the vehicle 100.

A direct current (DC)/DC converter 94 steps up an output voltage of the fuel cell 10 and supplies the stepped-up voltage to a power control unit (PCU) 95. Electric power generated by the fuel cell 10 is supplied to a load such as the driving motor 96 that drives vehicle wheels or the compressor 42, the pump 50, and various valves via a power supply circuit including the PCU 95. A motor electric power measuring unit 93 that measures power consumption of the driving motor 96 is provided in the PCU 95. The PCU 95 limits a current of the fuel cell 10 under the control of the control unit 80. A current meter 91 that measures a current of the fuel cell 10 and a voltage detecting unit 92 that measures a voltage of the fuel cell 10 are provided between the fuel cell 10 and the DC/DC converter 94. The current meter 91 and the voltage detecting unit 92 serve as a "second electric power measuring unit" that measures electric power generated by the fuel cell.

Figure 3:
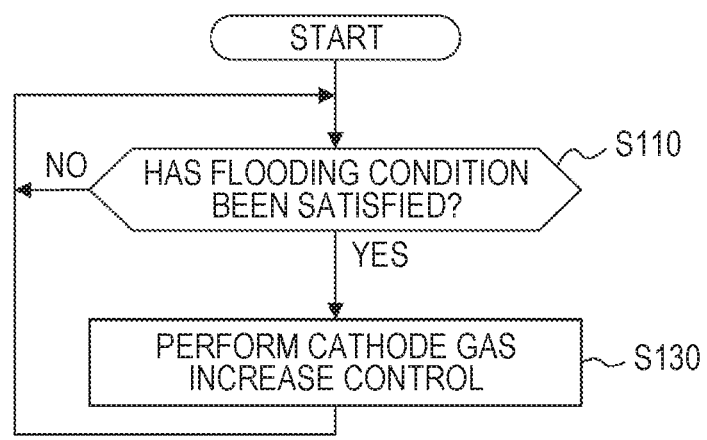
FIG. 3 is a flowchart illustrating a flooding determining process which is performed by a control unit.

FIG. 3 is a flowchart illustrating a flooding determining process which is performed by the control unit 80. The flooding determining process is repeatedly performed all the time while the vehicle 100 is operating. The control unit 80 starts the flooding determining process at the same time as starting of an output request from the ECU 82 to the fuel cell 10. An example of the time at which an output request from the ECU 82 to the fuel cell 10 is started is a time at which a driver of the vehicle 100 presses a start switch for starting operation of the vehicle 100. The control unit 80 ends the flooding determining process at the time at which the output request from the ECU 82 to the fuel cell 10 is ended.

When the flooding determining process is started, first, the control unit 80 determines whether a flooding condition has been satisfied. Here, the "flooding condition" means that a plurality of operation state parameters including the power consumption of the driving motor 96 and the speed and the acceleration of the vehicle 100 satisfies a predetermined condition which is assumed to be satisfied in a state in which a water surface has reached the discharge port 75. For example, one of following flooding conditions 1 and 2 can be employed as the flooding condition.

<Flooding Condition 1>

A state in which at least three conditions, (i) the power consumption of the driving motor 96 is equal to or greater than a predetermined motor electric power threshold value, (ii) the speed of the vehicle 100 is equal to or less than a predetermined speed threshold value, and (iii) the acceleration of the vehicle 100 is equal to or less than a predetermined acceleration threshold value, have been satisfied is continuously maintained for a predetermined time threshold value or more.

When a water surface reaches the discharge port 75, it is estimated that the speed or the acceleration of the vehicle 100 stays at a low value even when the driving motor 96 operates with considerable power consumption. Accordingly, when flooding condition 1 has been satisfied, it can be estimated that the water surface has reached the discharge port 75. Regarding the threshold values in flooding condition1, for example, the motor electric power threshold value is set to ⅓ of the maximum output of the driving motor 96, the speed threshold value of the vehicle 100 is set to 30 km/h, the acceleration threshold value is set to 0.1 m/s², and the time threshold value is set to 2 seconds. These threshold values can be determined by experiment. In this embodiment, since the maximum output of the driving motor 96 is 120 kw, "⅓ of the maximum output" is 40 kw. The threshold values of flooding condition 1 are not limited thereto, and, for example, the motor electric power threshold value may be set to 70% of the maximum output of the motor or may be set to 80% of the maximum output of the motor. The motor electric power threshold value may be set to, for example, 50 kw. Similarly, for example, the speed threshold value may be set to 25 km/h or may be set to 20 km/h. For example, the acceleration threshold value may be set to 0.5 m/s² or may be set to 1.0 m/s². For example, the time threshold value may be set to 5 seconds or may be set to 10 seconds.

<Flooding Condition 2>

A state in which five conditions of (i) the amount of accelerator operation is equal to or greater than a predetermined operation amount threshold value, (ii) the electric power generated by the fuel cell 10 is equal to or greater than a predetermined output threshold value, (iii) the power consumption of the driving motor 96 is equal to or greater than a predetermined motor electric power threshold value, (iv) the speed of the vehicle 100 is equal to or less than a predetermined speed threshold value, and (v) the acceleration of the vehicle 100 is equal to or less than a predetermined acceleration threshold value have been satisfied is continuously maintained for a predetermined time threshold value or more.

Since flooding condition 2 includes a larger number of operation state parameters than in flooding condition 1, a state in which a water surface has reached the discharge port 75 can be more accurately estimated than in flooding condition 1. Regarding the threshold values in flooding condition2, for example, the operation amount threshold value may be set to 60% of the maximum value of the amount of accelerator operation, the output threshold value may be set to 60% of the maximum output of the fuel cell, the motor electric power threshold value may be set to 60% of the maximum output of the motor, the speed threshold value may be set to 30 km/h, the acceleration threshold value may be set to 0.1 m/s², and the time threshold value may be set to 2 seconds. By adding the operation state parameters in this way, it is possible to perform cathode gas increase control when there is a higher likelihood that a water surface will have reached the discharge port 75.

When the control unit 80 determines that the flooding condition has not been satisfied (NO in Step S110), the flow returns to Step S110. On the other hand, when the control unit 80 determines that the flooding condition has been satisfied (YES in Step S110), the control unit 80 performs cathode gas increase control (Step S130). The "cathode gas increase control" refers to control for increasing a flow rate of a cathode gas supplied to the discharge pipe 38 such that the flow rate of the cathode gas when the flooding condition is satisfied is greater than the flow rate of the cathode gas when the flood condition is not satisfied on a condition that an amount of electric power generated by the fuel cell 10 when the flood condition is satisfied is equal to an amount of electric power generated by the fuel cell 10 when the flood condition is not satisfied. In this embodiment, the control unit 80 increases an amount of cathode gas supplied to the discharge pipe 38 by increasing the rotation speed of the compressor 42 serving as the cathode gas supply unit. In this embodiment, the cathode gas increase control is performed for one minute, but the disclosure is not limited thereto and the cathode gas increase control may be performed, for example, until the flooding condition is not satisfied. After the cathode gas increase control has been performed, the flow returns to Step S110. The control unit 80 repeatedly performs the above-mentioned series of processes until the output request from the ECU 82 is ended.

Figure 4:
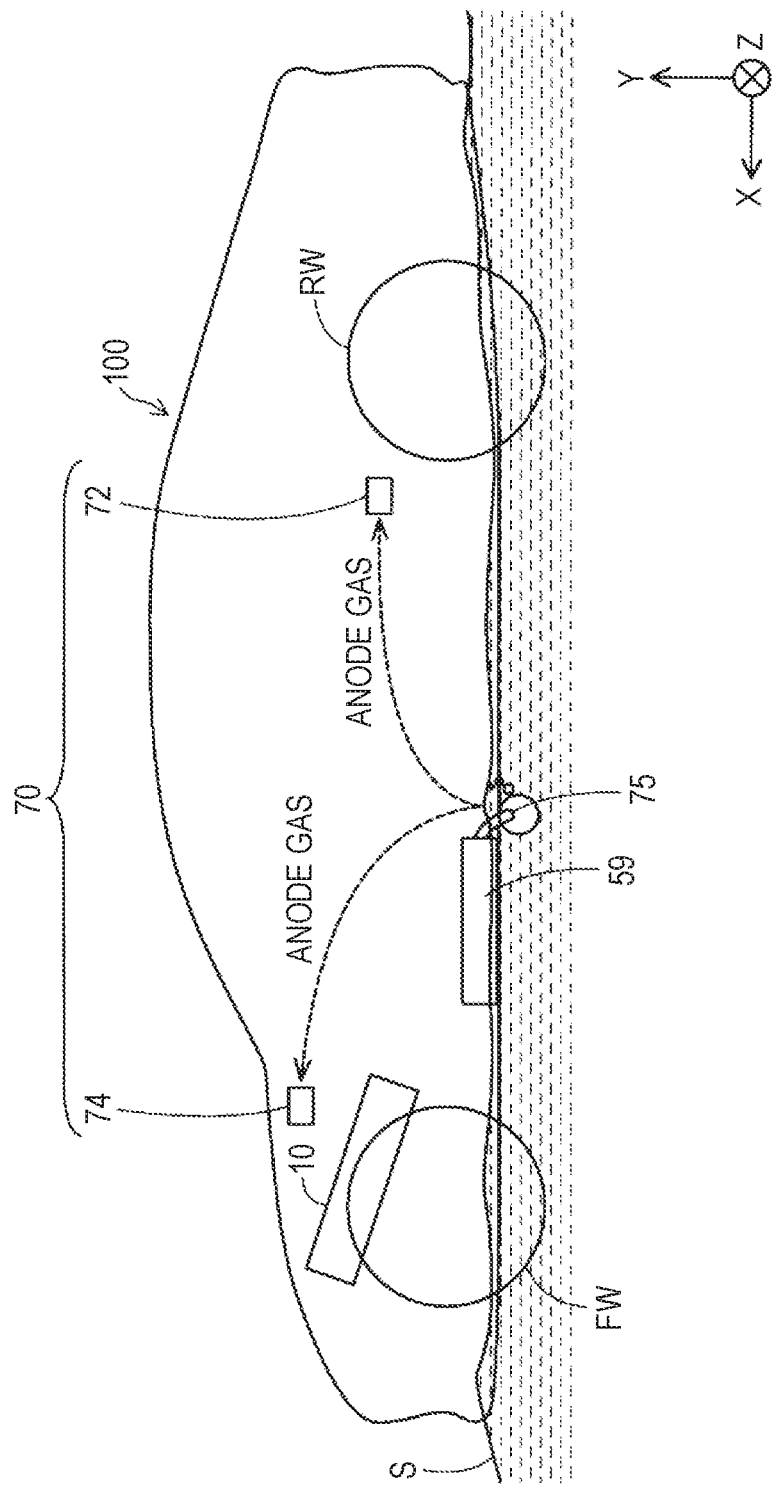
FIG. 4 is a diagram illustrating a state in which a water surface has reached a discharge port.

FIG. 4 is a diagram illustrating a state in which a water surface S has reached the discharge port 75. In general, gas discharged from the discharge port 75 diffuses into the atmosphere. On the other hand, when a water surface S reaches the discharge port 75, diffusion of gas discharged from the discharge port 75 is hindered by water and there is concern that the discharged gas may invade into the vehicle 100 from a gaps between the discharge port 75 and the undercover 77 of the vehicle 100 or other gaps. As a result, there is concern that the anode gas detector 70 provided in the vehicle 100 may detect an anode gas included in the discharged gas. When the concentration of the detected anode gas is equal to or greater than a predetermined value (for example, 3%), there is concern that the ECU 82 may erroneously determine leakage of gas from the anode gas tank 60 or the fuel cell 10 and request the control unit 80 to stop the operation of the fuel cell system 110.

However, in this embodiment, when the flooding condition has been satisfied, cathode gas increase control for increasing an amount of cathode gas supplied to the discharge port 75 is performed. As a result, an amount of anode gas relative to the total amount of gas discharged from the discharge port 75 is diluted. Accordingly, even when the discharged gas invades into the vehicle 100, it is possible to prevent the discharged gas from being detected by the anode gas detector 70. Particularly, in this embodiment, since the discharge port 75 is provided between the first anode gas detector 72 and the second anode gas detector 74 in the traveling direction (the +X-axis direction) of the vehicle 100, there is concern that the gas invading into the vehicle 100 may reach the first anode gas detector 72 or the second anode gas detector 74. However, according to this embodiment, it is possible to effectively prevent leakage of an anode gas from being erroneously detected by the anode gas detector 70 by the cathode gas increase control.

B. Second Embodiment

Figure 5:
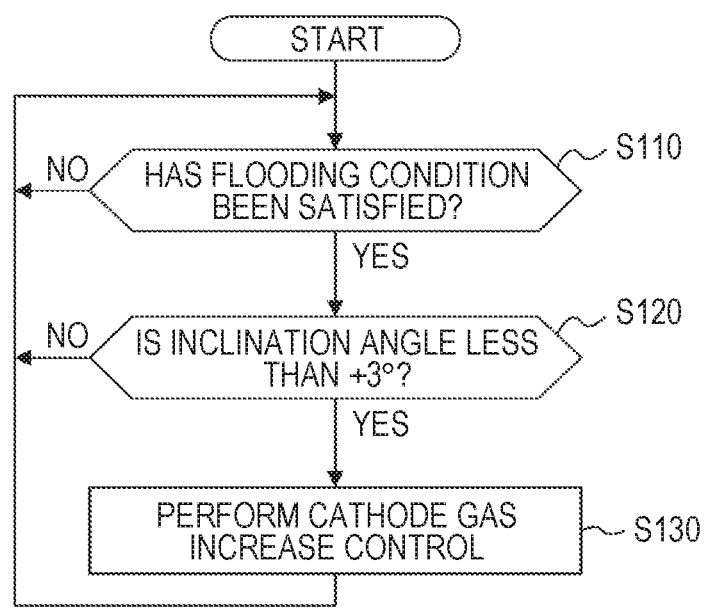
FIG. 5 is a flowchart illustrating a flooding determining process in a second embodiment.

FIG. 5 is a flowchart illustrating a flooding determining process according to a second embodiment. The second embodiment is the same as the first embodiment except that Step S120 is additionally provided between Step S110 and Step S130.

In the second embodiment, when the control unit 80 determines that the flooding condition has been satisfied (YES in Step S110), the control unit 80 determines whether an inclination angle in the length direction (the X-axis direction) of the vehicle 100 with respect to a horizontal plane is less than +3° (Step S120). In this embodiment, the inclination angle is detected by the inclination angle detecting unit 99. Here, when the inclination angle has a "+ (positive)" value, the front of the vehicle 100 is located higher in the vertical direction than the rear of the vehicle 100, which indicates an uphill inclination. When the inclination angle has a "− (negative)" value, the front of the vehicle 100 is located lower in the vertical direction than the rear of the vehicle 100, which indicates a downhill inclination.

When the control unit 80 determines that the inclination angle is less than +3° (YES in Step S120), the control unit 80 performs cathode gas increase control (Step S130). On the other hand, when the control unit 80 determines that the inclination angle is equal to or greater than +3° (NO in Step S120), the flow returns to Step S110. That is, in the second embodiment, when the inclination angle indicates an uphill inclination of +3° or more, the cathode gas increase control is not performed. Accordingly, according to the second embodiment, since the cathode gas increase control is not performed in a situation in which the vehicle 100 is considered to be traveling on an uphill road, it is possible to improve fuel efficiency. In this embodiment, Step S120 is performed between Step S110 and Step S130, but the disclosure is not limited thereto and Step S120 may be performed before Step S110.

C. Other Embodiments

In the above-mentioned embodiments, as the cathode gas increase control, the control unit 80 increases an amount of cathode gas supplied to the discharge port 75 by increasing the rotation speed of the compressor 42 serving as the cathode gas supply unit. However, a method of increasing the amount of cathode gas supplied to the discharge port 75 is not limited thereto. For example, the amount of cathode gas supplied to the discharge port 75 may be increased by controlling the ON-OFF valve 44 of the cathode gas supply passage 22 and the flow control valve 48 of the bypass flow passage 26 such that the amount of cathode gas passing through the bypass flow passage 26 is increased.

That is, as the cathode gas increase control, bypass flow increase control for increasing a flow rate of the cathode gas in the bypass flow passage 26 in comparison with a case in which the cathode gas increase control is not performed may be performed. Accordingly, since a pressure loss decreases by increasing the flow rate of the cathode gas passing through the bypass flow passage 26 and reaching the discharge port 75 in comparison with a case in which the flow rate of the cathode gas passing through the fuel cell 10 and reaching the discharge port 75 is increased, it is possible to improve fuel efficiency.

The fuel cell system 110 may further include a pressure measuring unit that measures a pressure at a cathode gas inlet or a cathode gas outlet of the fuel cell 10 and may not perform the bypass flow increasing control when the pressure measured by the pressure measuring unit is equal to or greater than a predetermined pressure threshold value. The pressure threshold value may be, for example, a pressure at which the flow rate of the cathode gas at the cathode gas inlet of the fuel cell 10 is 700 NL/min or a pressure at which the flow rate of the cathode gas is 1500 NL/min. Accordingly, when the anode gas discharged from the discharge port 75 is considered to be satisfactorily diluted by the cathode gas discharged from the fuel cell 10, unnecessary suppression control may not be performed.

In the above-mentioned embodiment, when the control unit 80 determines that a predetermined time has elapsed after the drain valve 57 has been closed, the control unit 80 may not perform the cathode gas increase control. The predetermined time may be, for example, 5 seconds, 3 seconds, or 10 seconds. Accordingly, when the flooding condition is not estimated to be satisfied by opening the drain valve 57, the cathode gas increase control is not performed. That is, in a situation in which anode leakage is considered to actually occur, the cathode gas increase control is not performed. As a result, it is possible to satisfactorily detect anode leakage.

In the above-mentioned embodiments, when the flooding condition has been satisfied, relaxation control for relaxing a detection criterion which is used for the anode gas detector 70 to detect leakage of an anode gas within a limited range in comparison with a case in which the flooding condition has not been satisfied may be performed in addition to the cathode gas increase control or instead of the cathode gas increase control. Here, when an average concentration of the anode gas in a detection period (for example, 2 seconds) is greater than an average concentration threshold value (for example, 3%), the detection criterion in this embodiment is satisfied and the anode gas detector 70 detects leakage of an anode gas. The limited range means that the average concentration of the anode gas for 3 seconds is less than 4%.

For example, in the relaxation control, the average concentration threshold value is set to a first concentration (for example, 3%) when the flooding condition has not been satisfied, and is set to a second concentration (for example, 4%) when the flooding conditions has been satisfied. By relaxing the detection criterion within the limited range in this way, it is possible to prevent the anode gas detector 70 from erroneously detecting leakage of an anode gas even when the gas discharged from the discharge port 75 invades into the vehicle 100. The relaxation control is not limited thereto and the detection period may be relaxed. Specifically, the detection period may be set to a first period (for example, 2 seconds) when the flooding condition has not been satisfied, and may be set to a second period (for example, 3 seconds) which is longer than the first period when the flooding condition has been satisfied. Accordingly, since a peak of the average concentration decreases, it is possible to prevent the anode gas detector 70 from erroneously detecting leakage of an anode gas even when the gas discharged from the discharge port 75 invades into the vehicle 100. The relaxation using the detection period may be performed in parallel with the relaxation using the average concentration threshold value.

In the above-mentioned embodiments, when an increase in concentration of the anode gas which is detected by the anode gas detector 70 exceeds a predetermined allowable range, the control unit 80 may not perform the cathode gas increase control. That is, when an increase in concentration of the anode gas within a predetermined period (for example, 10 seconds) exceeds a predetermined allowable range (for example, 3%), the control unit 80 may not perform the cathode gas increase control. Accordingly, since the cathode gas increase control is not performed in a situation in which anode leakage is considered to actually occur, it is possible to satisfactorily detect anode leakage.

In the above-mentioned embodiments, the upper limit of the power consumption of the driving motor 96 in flooding conditions 1 and 2 is not particularly limited and, for example, the maximum output of the driving motor 96 can be employed. Similarly, the lower limit of the speed of the vehicle 100 in flooding conditions 1 and 2 is not particularly limited and, for example, 0 km/h can be employed. The lower limit of the acceleration in flooding conditions 1 and 2 is not particularly limited and, for example, −10 m/s² can be employed.

In the above-mentioned embodiments, hydrogen gas is used as the anode gas, but the disclosure is not limited thereto. For example, alcohol or hydrocarbon may be used.

The disclosure is not limited to the above-mentioned embodiments and can be embodied in various forms without departing from the gist thereof. For example, the technical features of the embodiments corresponding to the technical features in the aspects described in the SUMMARY can be appropriately substituted or combined in order to solve some or all of the above-mentioned problems or to achieve some or all of the above-mentioned advantageous effects. The technical features can be appropriately deleted as long as they are not described to be essential in this specification.

What is claimed is:

1. A vehicle in which a fuel cell system including an anode gas detector is mounted, the vehicle comprising:
   a fuel cell that generates electric power by electrochemical reaction between an anode gas and a cathode gas;
   a discharge pipe that includes a discharge port for discharging gas including the anode gas and the cathode gas;
   a cathode gas supply unit that supplies the cathode gas to the discharge pipe;
   a driving motor that drives wheels of the vehicle;
   a first electric power measuring unit that measures power consumption of the driving motor;
   a second electric power measuring unit that measures electric power generated by the fuel cell;
   a vehicle speed sensor that measures a speed and an acceleration of the vehicle; and
   a control unit programmed to control the cathode gas supply unit,
   wherein when a plurality of operation state parameters has satisfied a predetermined flooding condition, the control unit is programmed to perform cathode gas increase control for increasing a flow rate of the cathode gas supplied from the cathode gas supply unit to the discharge pipe such that the flow rate of the cathode gas when the predetermined flooding condition is satisfied is greater than the flow rate of the cathode gas when the predetermined flood condition is not satisfied on a condition that an amount of electric power generated by the fuel cell when the predetermined flood condition is satisfied is equal to an amount of electric power generated by the fuel cell when the predetermined flood condition is not satisfied, the plurality of operation state parameters including the power consumption of the driving motor and the speed and the acceleration of the vehicle, and the predetermined flooding condition being assumed to be satisfied in a state in which a water surface reaches the discharge port, and
   wherein the control unit is programmed to determine that the predetermined flooding condition has been satisfied when a state in which at least three conditions, (i) the power consumption of the driving motor is equal to or greater than a predetermined first threshold value, (ii) the speed is equal to or less than a predetermined second threshold value, and (iii) the acceleration is equal to or less than a predetermined third threshold value are satisfied is continuously maintained for a predetermined fourth threshold value or more.

2. The vehicle according to claim 1, wherein the first threshold value is set to ⅓ of a maximum output of the driving motor, the second threshold value is set to 30 km/h, the third threshold value is set to 0.1 m/s², and the fourth threshold value is set to 2 seconds.

3. The vehicle according to claim 1, further comprising an accelerator operation amount sensor that measures an amount of accelerator operation of the vehicle,
   wherein the control unit is programmed to determine that the predetermined flooding condition has been satisfied when a state in which at least five conditions, (i) the amount of accelerator operation is equal to or greater than a predetermined fifth threshold value, (ii) the amount of electric power generated by the fuel cell is equal to or greater than a predetermined sixth threshold value, (iii) the power consumption of the driving motor is equal to or greater than the predetermined first threshold value, (iv) the speed is equal to or less than the predetermined second threshold value, and (v) the acceleration is equal to or less than the predetermined third threshold value, are satisfied is continuously maintained for the predetermined fourth threshold value or more.

4. The vehicle according to claim 1, further comprising an inclination angle detecting unit programmed to detect an inclination angle in a length direction of the vehicle with respect to a horizontal plane,
 wherein the control unit is programmed to prohibit the cathode gas increase control when the inclination angle indicates an uphill inclination of +3° or more.

5. A control method for a vehicle in which a fuel cell system including a fuel cell that generates electric power by electrochemical reaction between an anode gas and a cathode gas, a discharge pipe that includes a discharge port for discharging gas including the anode gas and the cathode gas, a cathode gas supply unit that supplies the cathode gas to the discharge pipe, and a driving motor that drives wheels of the vehicle is mounted, the control method comprising:
 when a plurality of operation state parameters has satisfied a predetermined flooding condition, performing cathode gas increase control for increasing a flow rate of the cathode gas supplied from the cathode gas supply unit to the discharge pipe such that the flow rate of the cathode gas when the predetermined flooding condition is satisfied is greater than the flow rate of the cathode gas when the predetermined flood condition is not satisfied on a condition that an amount of electric power generated by the fuel cell when the predetermined flood condition is satisfied is equal to an amount of electric power generated by the fuel cell when the predetermined flood condition is not satisfied, the plurality of operation state parameters including power consumption of the driving motor and a speed and an acceleration of the vehicle, and the predetermined flooding condition being assumed to be satisfied in a state in which a water surface reaches the discharge port; and
determining that the predetermined flooding condition has been satisfied when a state in which at least three conditions, (i) the power consumption of the driving motor is equal to or greater than a predetermined first threshold value, (ii) the speed is equal to or less than a predetermined second threshold value, and (iii) the acceleration is equal to or less than a predetermined third threshold value, are satisfied is continuously maintained for a predetermined fourth threshold value or more.

\* \* \* \* \*